April 10, 1956     H. WOODHALL     2,741,248
SURGICAL SAWS
Filed Nov. 10, 1954
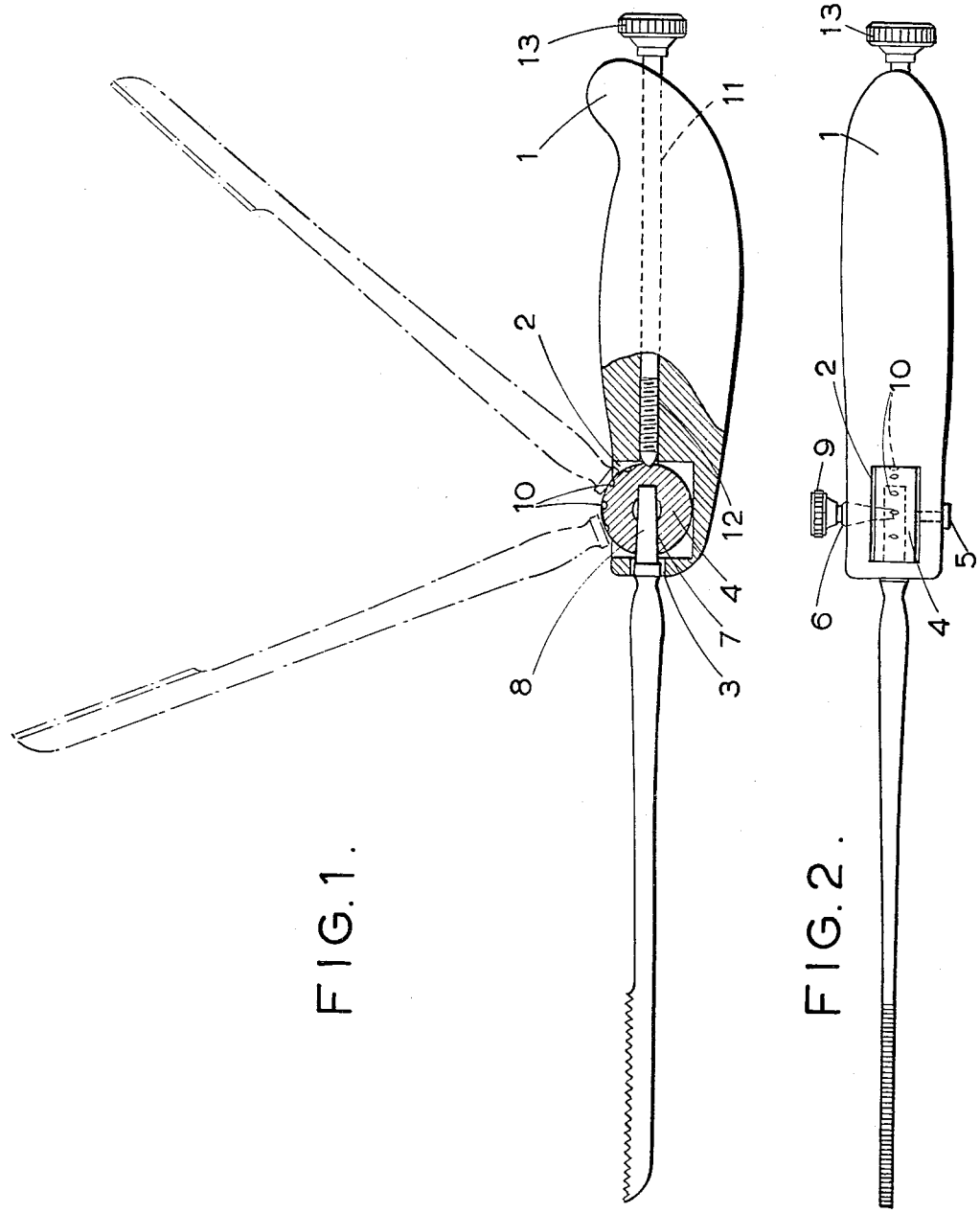
INVENTOR
Harold Woodhall
BY
Albert Jacobs
ATTORNEY

United States Patent Office 2,741,248
Patented Apr. 10, 1956

2,741,248
SURGICAL SAWS

Harold Woodhall, London, England, assignor to Allen & Hanburys Limited, London, England, a British company Application November 10, 1954, Serial No. 468,081

Claims priority, application Great Britain December 16, 1953

2 Claims. (Cl. 128—317)

This invention relates to surgical saws for performing nasal or other operations.

According to the present invention such a saw comprises a handle, a blade holder rotatably mounted in the handle, and means for maintaining the blade holder at a desired angular position with respect to the handle. By this means, the angular position of the saw blade with respect to the handle can be adjusted to suit the requirements of the surgeon; such adjustment has not been possible with known saws.

The saw provided by the invention may comprise a handle having a chamber open on at least one side, a cylindrical blade holder rotatably mounted in the chamber and having indentations in its periphery, and a rod screwed in a bore in the handle and engageable in any one of the indentations to lock the blade holder in a desired angular position. The blade holder is preferably so arranged that a saw blade can be removably secured in it as surgeons require saw blades having a variety of shapes and tooth formations.

A preferred embodiment of the invention is illustrated in the accompanying drawings in which:

Figure 1 is an elevation, partly in section, and
Figure 2 is a plan view of a saw.

In the embodiment of the invention illustrated in the accompanying drawings, a saw comprises a metal handle 1 having a chamber 2 opening to one side and, through a passage 3, to one end. A cylindrical blade holder 4 is mounted in this chamber 2 to be rotatable on two pivots 5, 6 which enter each end of the holder 4. A passage 7 of square or rectangular cross-secion extends inwards from the periphery of the blade holder 4 and is arranged to receive a saw blade end 8 of corresponding shape and size. The pivot 6 of the blade holder 4 is in the form of a set screw which has an outer head 9 with a knurled edge and an inner end that can enter the passage to engage a groove or recess (not visible in drawings) in the blade end 7 so as to secure the blade in the holder.

The periphery of the blade holder 4 also has a series of indentations 10 which can be in the form of depressions, serrations, teeth or the like. Any one of these indentations can be engaged by the inner end of a locking rod 11 which is movable inside a bore 12 extending lengthwise of the handle 1. This rod 11 has an externally screw threaded portion which can work in an internally threaded portion of the bore. The outer end of the rod 11 extends out of the end of the handle and has a head 13 with a knurled edge. The rod 11 can therefore be rotated so that the inner end of the rod is engaged in, or disengaged from, any one of the indentations 10 to lock the blade holder 4 in a desired angular position or to release it as desired.

What I claim is:

1. A surgical saw comprising a handle having a chamber open on at least one side and a bore extending from one end of the handle into the chamber, a cylindrical blade holder mounted in the chamber and having indentations in its periphery, and a rod screwed in said bore and engageable in any one of said indentations to lock said blade holder in a desired angular position.

2. A surgical saw comprising a handle having a chamber open on at least one side and a bore provided with a screw-threaded portion which leads from one end of the handle into said chamber; a cylindrical blade holder having extending inwards from its periphery a number of indentations and a passage adapted to receive an end of a removable saw blade; a first pivot screw entering one end of said blade holder; a second pivot screw entering in the other end of said blade holder and adapted to enter said passage so as to engage said blade end and prevent said blade being withdrawn; and a rod screwed in said bore and engageable in any one of said indentations to lock said blade holder in a desired angular position.

References Cited in the file of this patent

UNITED STATES PATENTS 196,893    Hamilton _____ Nov. 6, 1877